US012756000B2

(12) United States Patent
Tong et al.

(10) Patent No.: US 12,756,000 B2
(45) Date of Patent: Oct. 6, 2026

(54) POSITIONING MEMBER, WINDING DEVICE FOR ELECTRODE ASSEMBLY AND BATTERY MANUFACTURING DEVICE

(71) Applicant: CONTEMPORARY AMPEREX TECHNOLOGY (HONG KONG) LIMITED, Hong Kong (CN)

(72) Inventors: Pan Tong, Ningde (CN); Song Zhang, Ningde (CN); Lei Song, Ningde (CN); Guangcheng Zhong, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 606 days.

(21) Appl. No.: 18/221,882

(22) Filed: Jul. 14, 2023

(65) Prior Publication Data

US 2024/0243334 A1 Jul. 18, 2024

Related U.S. Application Data

(63) Continuation of application No. PCT/CN2023/080538, filed on Mar. 9, 2023.

(30) Foreign Application Priority Data

Jan. 12, 2023 (CN) ......................... 202320125283.7

(51) Int. Cl.
*H01M 10/04* (2006.01)
*B65H 18/02* (2006.01)
(Continued)

(52) U.S. Cl.
CPC ........ *H01M 10/0409* (2013.01); *B65H 18/02* (2013.01); *B65H 18/10* (2013.01);
(Continued)

(58) Field of Classification Search
CPC ......... H01M 10/0409; H01M 10/0431; H01M 2220/20; B65H 18/02; B65H 18/10; B65H 75/30; B65H 2301/414324
(Continued)

(56) References Cited

FOREIGN PATENT DOCUMENTS

| | | |
|---|---|---|
| CN | 202761431 U | 3/2013 |
| CN | 207558951 U | 6/2018 |

(Continued)

OTHER PUBLICATIONS

International Search Report issued Sep. 14, 2023 in International Patent Application No. PCT/CN2023/080538 with English Translation.

(Continued)

*Primary Examiner* — Allison Bourke
*Assistant Examiner* — Robert Gene West
(74) *Attorney, Agent, or Firm* — XSENSUS LLP

(57) ABSTRACT

A positioning member, a winding device for an electrode assembly, and a battery manufacturing device are disclosed in the present application. The positioning member may be used for being inserted into a first groove on an outer peripheral surface of the winding pin, which may be used for winding an electrode sheet and a separator. The positioning member may be provided with a second groove, which may be configured for a clamping pin to insert so as to position relative positions of the first groove and the clamping pin.

11 Claims, 5 Drawing Sheets

(51) Int. Cl.
*B65H 18/10* (2006.01)
*B65H 75/30* (2006.01)

(52) U.S. Cl.
CPC ........ *B65H 75/30* (2013.01); *H01M 10/0431* (2013.01); *B65H 2301/414324* (2013.01); *H01M 2220/20* (2013.01)

(58) Field of Classification Search
USPC .......................................................... 429/164
See application file for complete search history.

(56) References Cited

FOREIGN PATENT DOCUMENTS

| | | | | | |
|---|---|---|---|---|---|
| CN | 208659484 | U | * | 3/2019 | |
| CN | 110247095 | A | | 9/2019 | |
| CN | 112490488 | A | * | 3/2021 | ........ H01M 10/0409 |
| CN | 213692133 | U | | 7/2021 | |
| CN | 217444460 | U | | 9/2022 | |
| JP | S62-143380 | A | | 6/1987 | |
| KR | 20030053599 | A | | 7/2003 | |
| WO | 2018/025785 | A1 | | 2/2018 | |

OTHER PUBLICATIONS

Extended European Search Report issued Nov. 12, 2024 in European Patent Application No. 23736586.1.

* cited by examiner

POSITIONING MEMBER, WINDING DEVICE FOR ELECTRODE ASSEMBLY AND BATTERY MANUFACTURING DEVICE

CROSS-REFERENCE TO RELATED APPLICATIONS

The present application is a continuation of International Application No. PCT/CN2023/080538, filed Mar. 9, 2023, which claims priority of Chinese Patent Application No. 202320125283.7 filed on Jan. 12, 2023 and entitled "POSITIONING MEMBER, WINDING DEVICE FOR ELECTRODE ASSEMBLY AND BATTERY MANUFACTURING DEVICE," each of which is incorporated herein by reference in its entirety.

TECHNICAL FIELD

The present application relates to the field of batteries, and in particular, to a positioning member, a winding device for an electrode assembly, and a battery manufacturing device.

BACKGROUND

Batteries are widely used in electronic devices such as mobile phones, laptops, electric motorcycles, electric vehicles, electric ships, electric planes, electric toys, and electric tools. The batteries may be classified into nickel-cadmium batteries, nickel-hydride batteries, lithium-ion batteries, secondary alkaline zinc-manganese batteries, and the like.

At present, with the expansion of a usage range of batteries, higher requirements are placed on the product quality of the batteries. How to improve the production yield of the batteries is an urgent problem to be solved in the battery technologies.

SUMMARY OF THE DISCLOSURE

In view of the above problems, the present application provides a positioning member, a winding device for an electrode assembly, and a battery manufacturing device, which are capable of effectively improving the yield of batteries.

In the first aspect, the present application provides a positioning member, the positioning member is used for being inserted into a first groove on an outer peripheral surface of a winding pin, which is used for winding an electrode sheet and a separator. The positioning member is provided with a second groove, which is configured for a clamping pin to insert so as to position relative positions of the first groove and the clamping pin.

In the technical solution of the embodiment of the present application, the positioning member is arranged in the first groove, and a part of a space in the first groove is filled to limit movement of the clamping pin with respect to the winding pin in an axial direction of the winding pin, thereby preventing a position of the clamping pin with respect to the winding pin from being shifted in a moving process, so as to ensure that the position of the clamping pin with respect to the winding pin is fixed, which is convenient for the clamping pin to pick up an electrode assembly after winding, and reduces a probability of wrinkling and deformation of the electrode assembly in a clamping process, so as to ensure the quality of the electrode assembly.

In some embodiments, the positioning member includes two centering measuring tools, and the two centering measuring tools are respectively placed in the two first grooves of the same winding pin. The centering measuring tool is provided with the second groove, and the two second grooves are arranged symmetrically with respect to an axis of the winding pin. The winding pin of a winding device for the electrode assembly itself has two first grooves, and the two first grooves are symmetrically distributed with respect to an axial direction of the winding pin. After the centering measuring tools are placed in the first grooves, by arranging the second grooves of the two centering measuring tools to be symmetrical with respect to the axis of the winding pin, it is capable of ensuring that the two clamping pins, after arranged in the first grooves, are also basically symmetrical with respect to the axial direction of winding pin. When the clamping pins clamp the wound electrode assembly, the two clamping pins can respectively clamp the electrode assembly on both sides, and divide the electrode assembly into two parts with relatively equal arc lengths in a winding direction. Balanced forces on both sides of the electrode assembly are capable of reducing the probability of wrinkling and deformation of the electrode assembly in the clamping process, thereby improving the product quality of the electrode assembly.

In some embodiments, the centering measuring tool has a first surface arranged toward the winding pin, and the shape of the first surface matches that of an inner wall of the first groove so as to attach the first surface to the winding pin. The first surface matches the shape of the first groove, which can facilitate the relative movement of the centering measuring tool in the first groove. The centering measuring tool further fills the first groove to reduce a gap between the clamping pin and the winding pin, and reduce the probability of positional shift during the movement of the clamping pin into the first groove, thereby ensuring the effect of positioning.

In some embodiments, the shape of the second groove matches the outline of the clamping pin. The second groove matches the outer shape of the clamping pin, which is capable of facilitating the movement of the clamping pin in the second groove and improving the positioning efficiency of the clamping pin.

In some embodiments, the centering measuring tool is made of a metal material, and the Vickers hardness of the metal material is greater than or equal to 200 HV. The structural hardness of the centering measuring tool is ensured, and interference from the centering measuring tool during the movement of the clamping pin means that the moving direction of the clamping pin needs to be adjusted, and with the above structural hardness, it is capable of stopping in time the shifted clamping pin from advancing, thereby ensuring the shift correction effect.

In some embodiments, the extension length of the centering measuring tool along the axial direction of the winding pin is H, and 100 mm≤H≤150 mm. Setting a reasonable length of the centering measuring tool is capable of reducing the difficulty of mounting and taking the centering measuring tool and improving the efficiency under the premise of ensuring a centering effect of the clamping pin and the winding pin.

In some embodiments, the centering measuring tool includes a filling portion and a guide portion. The filling portion is arranged in the first groove. The guide portion protrudes out of the filling portion along a surface of the filling portion away from the winding pin. There are two guide portions, which are arranged parallel to each other. The filling portion and the two guide portions jointly enclose to form the second groove. By arranging the filling portion, a gap in the first groove is filled to reduce a gap between the clamping pin and the winding pin, and the guide portion is arranged to limit a moving direction of the clamping pin with respect to the winding pin, so as to ensure that the clamping pin moves in a specified path to ensure that a position of the clamping pin with respect to the winding pin meets a preset requirement.

In some embodiments, the minimum distance between the two guide portions is H1, and the thickness of the clamping pin is D1, wherein 0.08 mm≤H1−D1≤0.15 mm. A reasonable gap is set between the clamping pin and the second groove, which is capable of ensuring that the clamping pin moves in the second groove while interfering with the shift of the clamping pin, thereby reducing the probability of shifting the moving direction of the clamping pin.

In some embodiments, a surface of the centering measuring tool is provided with a thickness identification used for matching the centering measuring tool with winding pins having first grooves of different shapes and clamping pins of different thicknesses. The thickness identification is used for displaying the thickness of the centering measuring tool itself, including information such as the thickness of the guide portion and the thickness of the filling portion. The above thickness needs to match different first grooves and clamping pins of different thicknesses. Identifying the thickness can facilitate an operator to choose a centering measuring tool of a suitable size and improve the use efficiency.

In a second aspect, the present application provides a winding device for an electrode assembly, including the positioning member according to the above embodiment, a winding pin, and a clamping pin. The first groove is arranged on the outer peripheral surface of the winding pin, which is used for winding an electrode sheet and a separator. The clamping pin is configured to be inserted into the second groove of the positioning member. The positioning member is used for positioning the relative positions of the clamping pin and the winding pin. In the winding device for the electrode assembly in the embodiment of the present application, the electrode sheet and the separator are wound and formed by arranging the winding pin, the clamping pin is inserted into the first groove of the winding pin and stretches the electrode assembly to form in the radial direction of the winding pin, and the electrode assembly is pulled from the winding pin in the axial direction of the winding pin so that the electrode assembly is stripped. In order to ensure that the moving direction of the clamping pin with respect to the winding pin meets a preset standard and reduces the probability of a movement shift of the clamping pin in the first groove, the positioning member is placed in the first groove, a part of the gap between the winding pin and the clamping pin is filled, and the clamping pin moves in the second groove of the positioning member, thereby improving the accuracy of the moving direction of the clamping pin, and realizing more accurate and stable clamping and releasing of the electrode assembly.

In some embodiments, there are two clamping pins, the outer circumference of the winding pin is provided with two first grooves, and the two clamping pins are each used for being arranged in the two first grooves. The two clamping pins are arranged parallel to each other, and the clamping pins are capable of moving in a direction perpendicular to an axis of the winding pin. The clamping pin moves up and down in the vertical direction, which is capable of adjusting the moving direction of the clamping pin in the second groove, improving the flexibility of clamping pin adjustment, and ensuring that the clamping pin moves in a preset direction in the second groove.

In a third aspect, the present application provides a battery manufacturing device, which includes the positioning member in the above embodiment or the winding device for an electrode assembly in the above embodiment.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

The features, advantages, and technical effects of exemplary embodiments of the present application will be described below with reference to the accompanying drawings.

DETAILED DESCRIPTION OF REFERENCE NUMERALS

Figure 1:
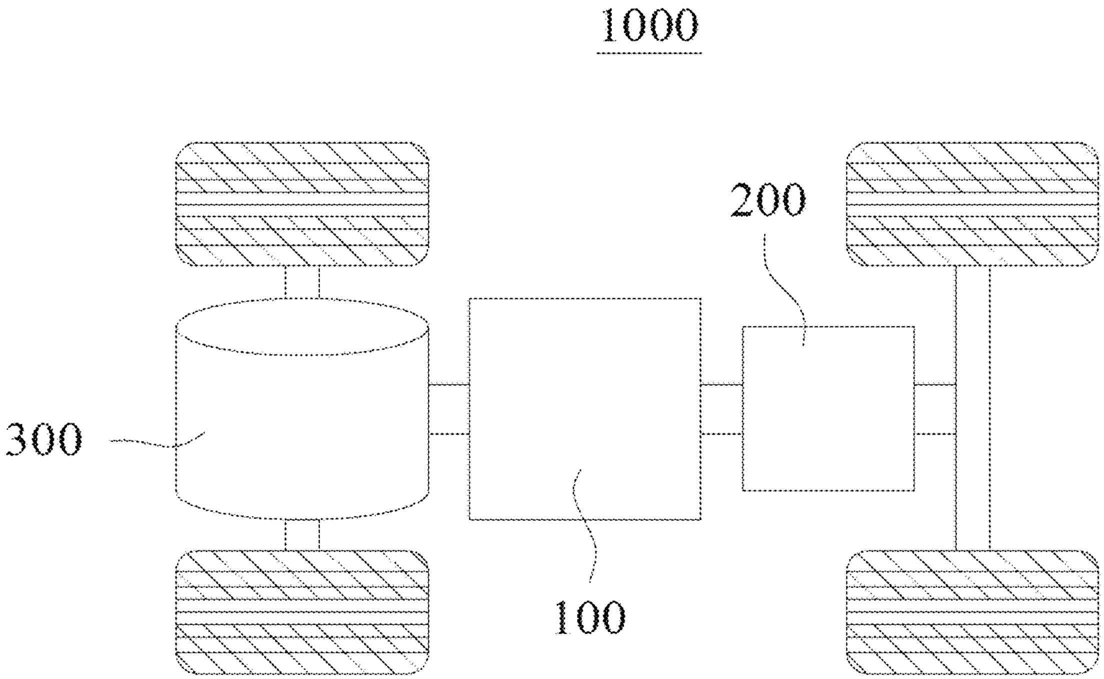
FIG. 1 is a schematic structural view of a vehicle according to an embodiment of the present application.

1000. Vehicle: 100. Battery: 200. Controller: 300. Motor: 400. Winding device for an electrode assembly: 10. Box body: 11. First part: 12. Second part: 20. Battery cell: 21. End cover assembly: 22. Case: 23. Electrode assembly: 24. Pressure relief mechanism; 25. Electrode; 30. Winding pin: 31. Half shaft: 32. First groove: 40. Clamping pin: 50. Positioning member: 51. Second groove: 52. Centering measuring tool: 53. First surface: 54. Filling portion: 55. Guide portion.

DETAILED DESCRIPTION

Examples of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application: the terms used herein are intended only for the purpose of describing specific examples and are not intended to limit the present application: the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "center," "longitudinal," "transverse," "length," "width," "thickness," "upper," "lower," "front," "back," "left," "right," "vertical," "horizontal," "top," "bottom," "inner," "outer," "clockwise," "counterclockwise," "axial," "radial," "circumferential," and the like are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "mount," "join," "connect," "fix," and the like should be understood in a broad sense, such as, a fixed connection, a detachable connection, or an integral connection: a mechanical connection, or an electrical connection: a direct connection, an indirect connection through an intermediate medium, an internal connection of two elements, or interaction between two elements. For those of ordinary skill in the art, the specific meanings of the above terms in the embodiments of the present application can be understood according to specific situations.

At present, the market of new energy vehicles is developing rapidly. Batteries are power sources of the new energy vehicles, and the yield and production efficiency of the batteries need to be further improved to meet requirements for energy vehicle production. A battery is usually composed of a plurality of battery cells that are in series connection, parallel connection, or parallel-series connection. The components in the battery cells that mainly undergo electrochemical reactions to store electrical energy include electrode sheets. A separator is arranged between the electrode sheets for insulation to prevent short circuits. The electrode sheet and the separator are arranged to be laminated, and wound to form into an electrode assembly.

In the related technology, a winding pin may be used for fixing end portions of the electrode sheet and the separator, and rotating around an axis to drive the electrode sheet and the separator to be wound. After winding and forming, it is necessary to use clamping pins to clamp the formed electrode assembly to achieve stripping. A surface of the winding pin is provided with two first grooves, the two first grooves extend along a winding axis of the winding pin, and the two clamping pins move in the axial direction and enter the two first grooves respectively. After fully entering, the two clamping pins move outward in a radial direction of the winding pin and are attached to an inner wall of the electrode assembly. At this time, the clamping pins are moved along the axis toward a direction away from the winding pin, and the electrode assembly is driven to move together. After the completion, the electrode assembly is released from the winding pin, thereby completing the stripping.

In the above clamping process of the clamping pins, the moving direction of the two clamping pins with respect to the winding pin is usually determined by an extension direction of the first groove. In order to adapt to various types of clamping pins, the width and depth of the first groove are set relatively large. When the clamping pin enters the first groove, there is still a large gap between the clamping pin and the winding pin, and the moving direction of the clamping pin may shift. After the clamping pin is shifted, the clamping of the electrode assembly by the two clamping pins cannot ensure the force balance on the electrode assembly, which may cause wrinkling, cracking, and other damage to the electrode assembly in the stripping process, thereby reducing the yield of the electrode assembly.

Based on the above problems, in order to improve the force balance of the electrode assembly in the clamping process and ensure the yield of the electrode assembly, the inventor researched and designed a positioning member. The positioning member is inserted into the first groove on an outer peripheral surface of the winding pin, the winding pin is used for winding an electrode sheet and a separator, the positioning member is provided with a second groove, which is configured for the clamping pin to insert so as to position relative positions of the first groove and the clamping pin.

The positioning member is arranged in the first groove, and a part of a space in the first groove is filled to limit movement of the clamping pin with respect to the winding pin in an axial direction of the winding pin, thereby preventing a position of the clamping pin with respect to the winding pin from being shifted in a moving process, so as to ensure that the position of the clamping pin with respect to the winding pin is fixed, which is convenient for the clamping pin to pick up an electrode assembly after winding, and reduces a probability of wrinkling and deformation of the electrode assembly in a clamping process, so as to ensure the quality of the electrode assembly, and improve the yield and the production efficiency of batteries.

For the convenience of description, the following embodiments are illustrated with an example in which the electrical apparatus according to an embodiment of the present application is a vehicle 1000.

Referring to FIG. 1, FIG. 1 is a schematic structural diagram of a vehicle 1000 according to some embodiments of the present application. The vehicle 1000 may be a fuel vehicle, a gas vehicle, or a new energy vehicle, and the new energy vehicle may be an all-electric vehicle, a hybrid vehicle, an extended range electric vehicle, or the like. The interior of the vehicle 1000 is provided with a battery 100, and the battery 100 may be provided at the bottom or head or tail of the vehicle 1000. The battery 100 can be used for powering the vehicle 1000. For example, the battery 100 may be used as an operating power source of the vehicle 1000. The vehicle 1000 may further include a controller 200 and a motor 300. The controller 200 is used for controlling the battery 100 to power the motor 300, for example, for meeting operating power requirements when the vehicle 1000 is starting, navigating, and driving.

In some embodiments of the present application, the battery 100 not only may serve as an operating power source of the vehicle 1000, but also may serve as a driving power source of the vehicle 1000, thus replacing or partially replacing fuel or natural gas to provide driving power for the vehicle 1000.

Figure 2:
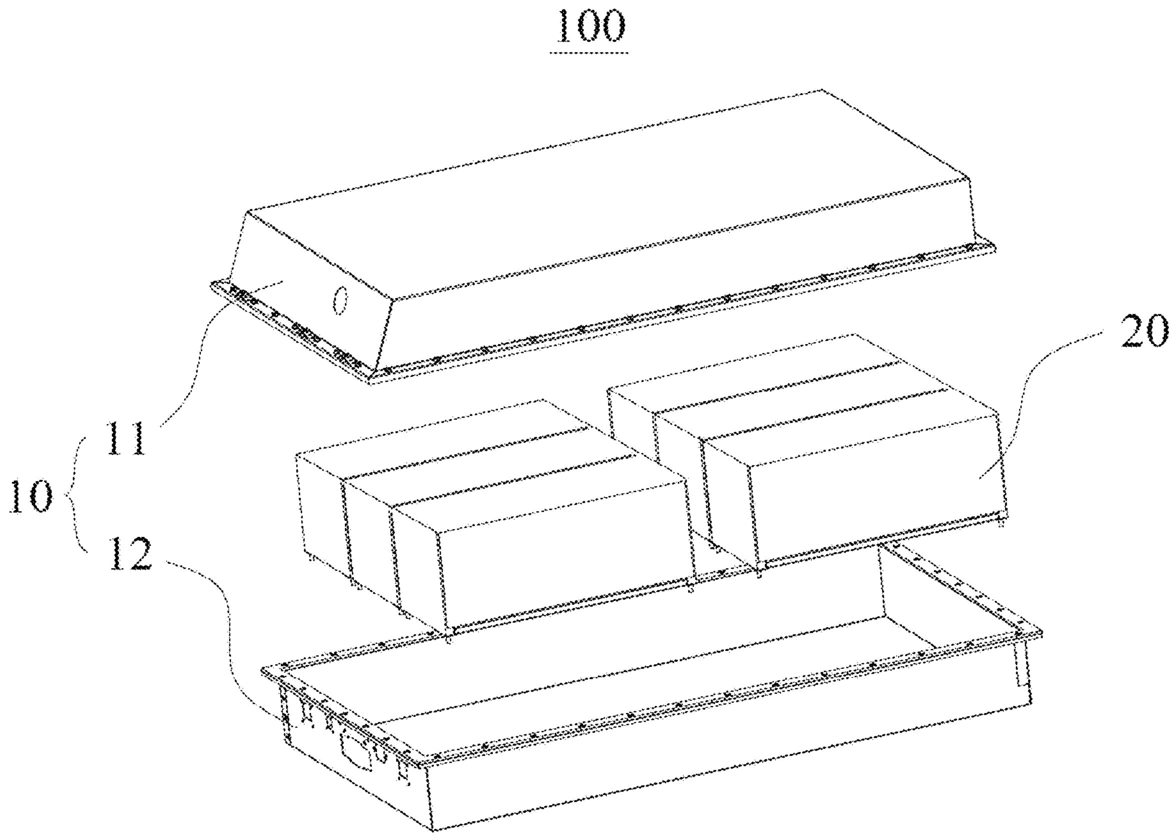
FIG. 2 is a schematic exploded structural diagram of a battery according to an embodiment of the present application.

Referring to FIG. 2, FIG. 2 is a schematic exploded structural diagram of a battery 100 according to some embodiments of the present application. The battery 100 includes a box body 10 and a battery cell 20, and the battery cell 20 is accommodated in the box body 10. The box body 10 is used for providing an accommodating space for the battery cell, and the box body 10 may be of various structures. In some embodiments, the box body 10 includes a first part 11 and a second part 12. The first part 11 and the second part 12 are covered by each other, and the first part 11 and the second part 12 together define an accommodating space for accommodating the battery cell 20.

In the battery 100, there may be a plurality of battery cells 20, and the plurality of battery cells 20 may be in series connection, parallel connection, or parallel-series connection, wherein the parallel-series connection means that the plurality of battery cells 20 are connected in both series and parallel. The plurality of battery cells 20 may be directly in series connection, parallel connection, or parallel-series connection, and then an entirety composed of the plurality of battery cells 20 may be accommodated in the box body 10. Definitely, the battery 100 may also be that the plurality of battery cells 20 are first in series connection, parallel connection, or parallel-series connection to form battery modules first, the plurality of battery modules may then be in series connection, parallel connection, or parallel-series connection to form an entirety, and the entirety is accommodated in the box body 10.

Each battery cell may be a secondary battery or a primary battery: or may be a lithium-sulfur battery cell, a sodium-ion battery cell, or a magnesium-ion battery cell, but is not limited thereto. The battery cell 20 may also be in the shape of a cylinder, a flat body, a cuboid, or others. In some embodiments, there may be a plurality of battery cells 20, and the plurality of battery cells 20 are in series connection, parallel connection, or parallel-series connection to form battery modules first. A plurality of battery modules are then in series connection, parallel connection, or parallel-series connection to form an entirety, and the entirety is accommodated in the box body 10.

Figure 3:
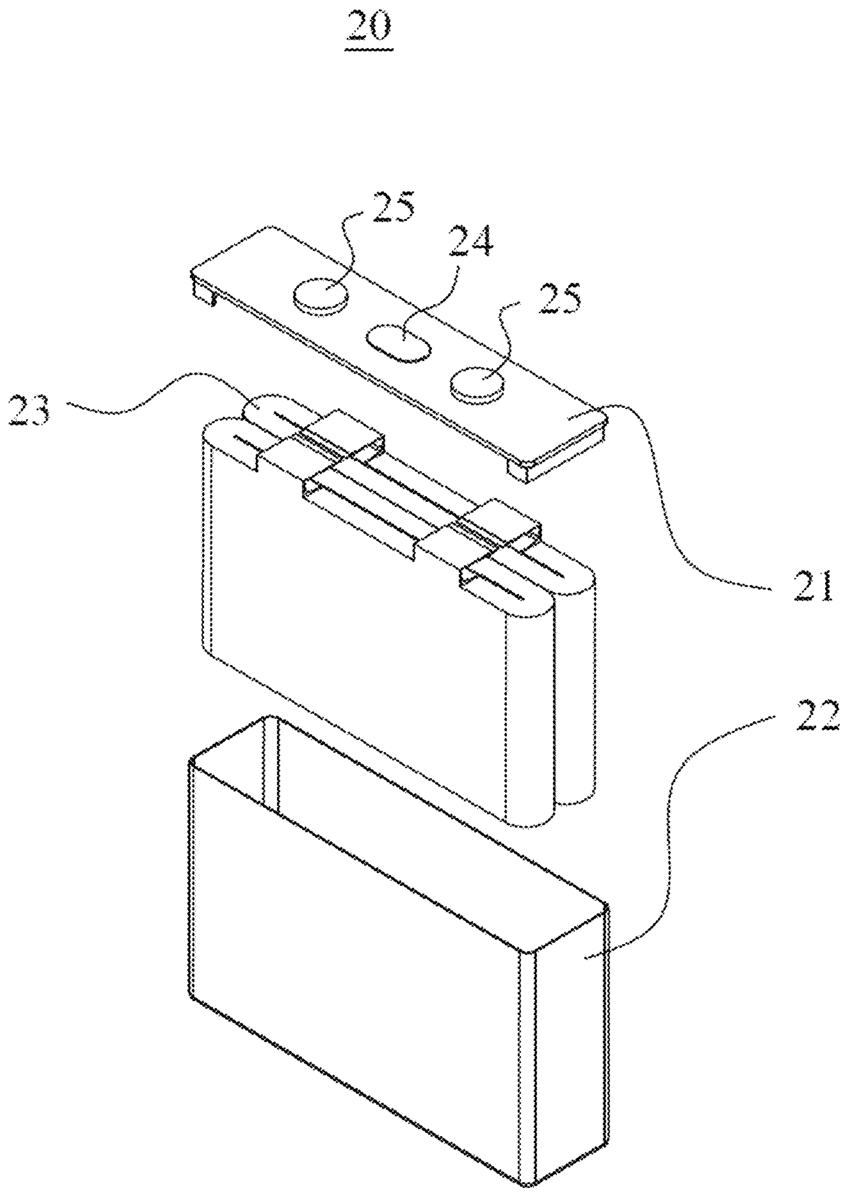
FIG. 3 is a schematic exploded structural diagram of a battery cell according to an embodiment of the present application.

In some embodiments, as shown in FIG. 3, which is a schematic exploded structural diagram of a battery cell 20 according to some embodiments of the present application. The battery cell 20 is the smallest unit forming a battery. The battery cell 20 includes an end cover assembly 21, a case 22, an electrode assembly 23, and other functional components.

The end cover assembly 21 refers to a component that covers an opening of the case 22 to isolate an internal environment of the battery cell 20 from the external environment. Without limitation, the shape of the end cover assembly 21 may be adapted to the shape of the case 22 to fit the case 22. Optionally, the end cover assembly 21 may be made of a material with certain hardness and strength (such as aluminum alloy), so that the end cover assembly 21 is not easily deformed when being squeezed and collided, the battery cell 20 is capable of having a higher structural strength, and the safety performance may also be improved.

In some embodiments of the present application, the end cover assembly 21 may be provided with functional components such as an electrode 25. The electrode 25 may be used for being electrically connected to the electrode assembly 23, for outputting or inputting electric energy of the battery cell 20.

In some embodiments of the present application, the end cover assembly 21 may further be provided with a pressure relief mechanism 24 used for relieving an internal pressure when the internal pressure or a temperature of the battery cell 20 reaches a threshold. The case 22 is a component for matching with the end cover assembly 21 to form the internal environment of the battery cell 20. The formed internal environment may be used for accommodating the electrode assembly 23, an electrolyte solution, and other components.

The electrode assembly 23 is a component in which an electrochemical reaction occurs in the battery cell 20. One or more electrode assemblies 23 may be included in the case 22. The electrode assembly 23 is mainly formed by winding or stacking a positive electrode sheet and a negative electrode sheet, and a separator is usually arranged between the positive electrode sheet and the negative electrode sheet. Parts of the positive electrode sheet and the negative electrode sheet with an active material constitute a main body part of the electrode assembly, and parts of the positive electrode sheet and the negative electrode sheet without the active material respectively constitute tabs. The positive tab and the negative tab may be jointly located at one end of the main body part or respectively located at two ends of the main body part. In charging and discharging processes of the battery, the positive active material and the negative active material react with the electrolyte solution, and the tabs are connected to electrode terminals to form a current loop.

Figure 4:
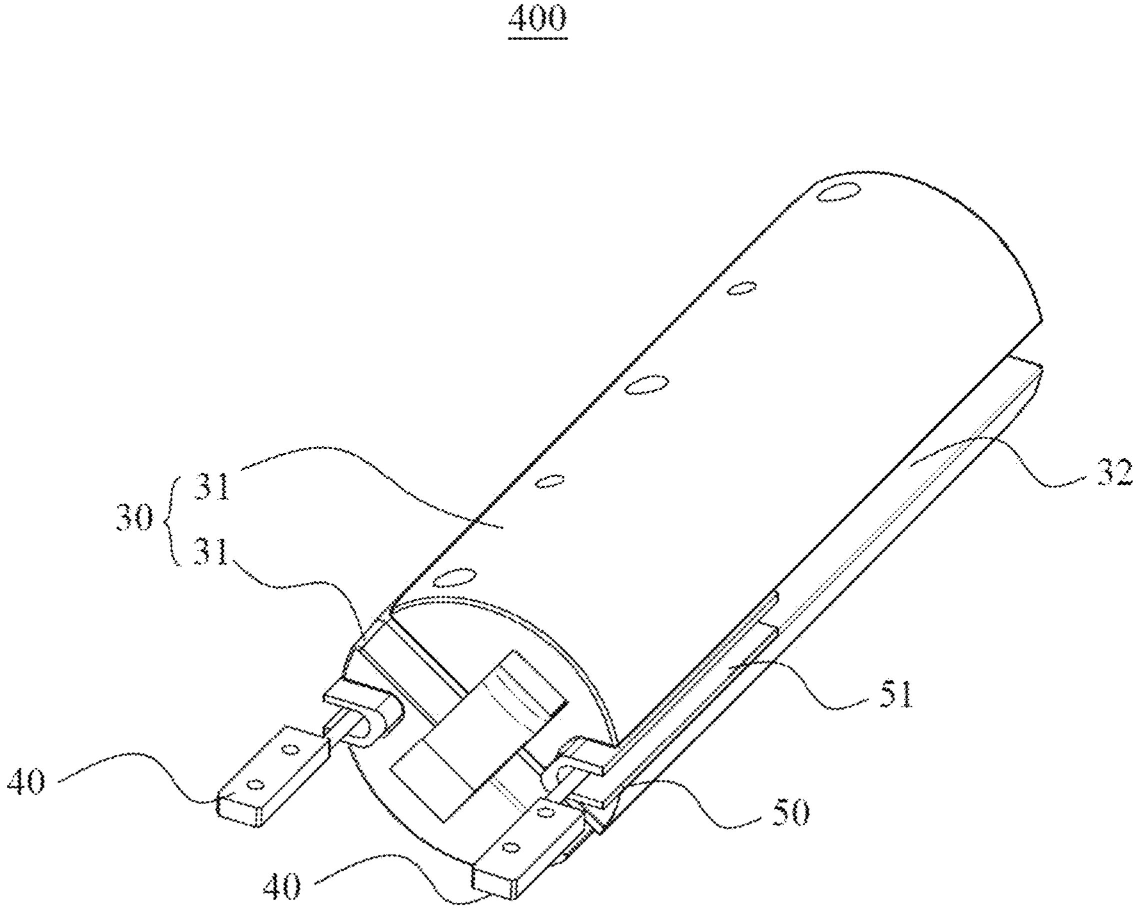
FIG. 4 is a schematic structural diagram of a winding device for an electrode assembly according to an embodiment of the present application.
Figure 5:
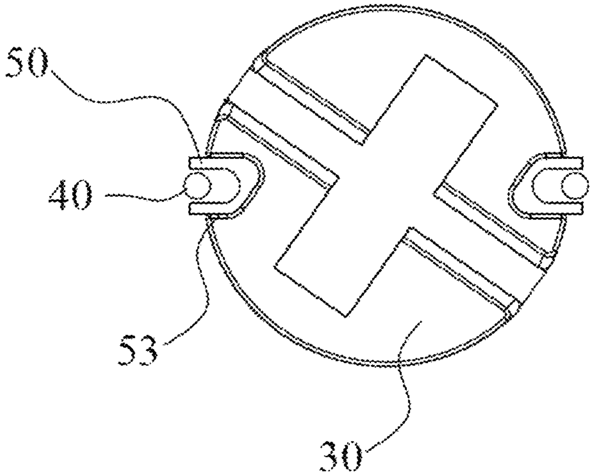
FIG. 5 is a schematic sectional structural diagram of a winding device for an electrode assembly according to an embodiment of the present application.
Figure 6:
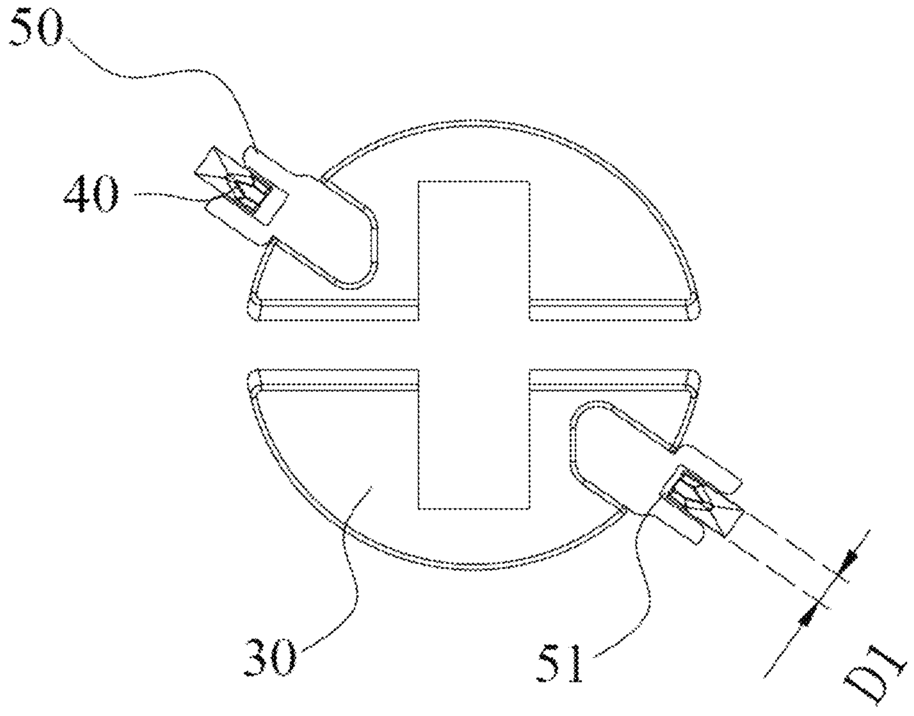
FIG. 6 is a schematic sectional structural diagram of a winding device for an electrode assembly according to another embodiment of the present application.
Figure 7:
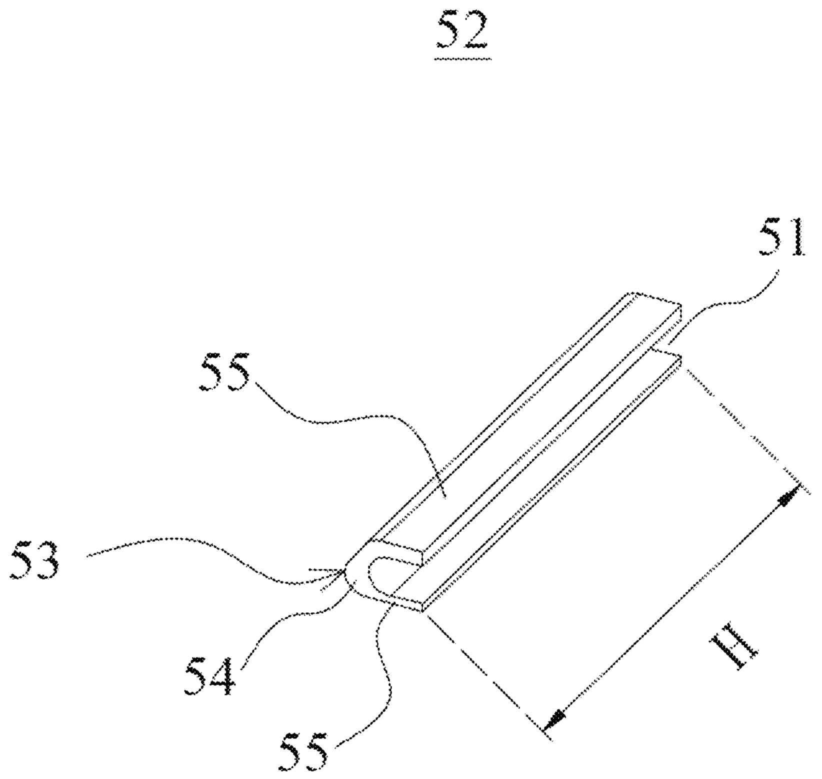
FIG. 7 is a schematic structural diagram of a centering measuring tool in a positioning member according to an embodiment of the present application.
Figure 8:
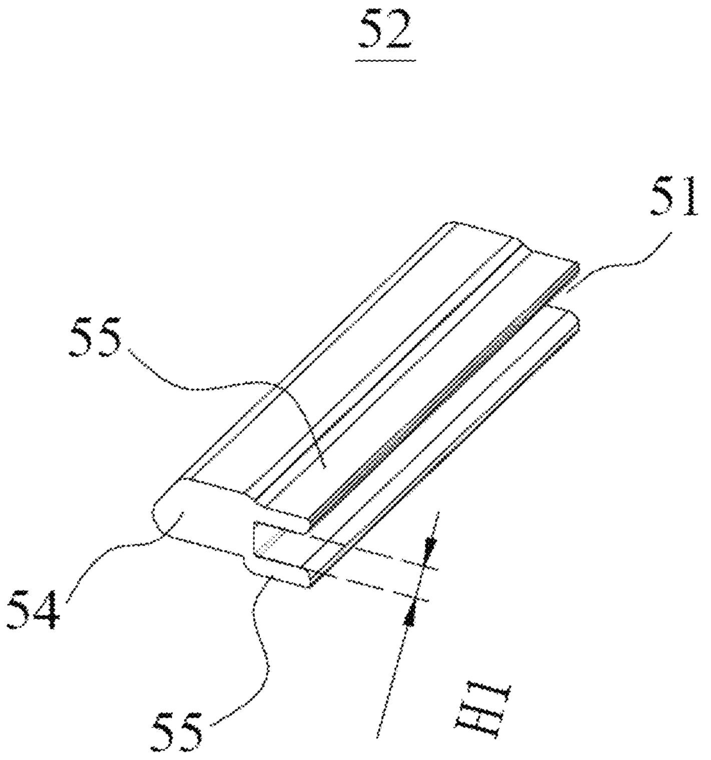
FIG. 8 is a schematic structural view of a centering measuring tool in the winding device for an electrode assembly shown in FIG. 6.

Referring to FIG. 4 to FIG. 8 together, FIG. 4 is a schematic structural diagram of winding device 400 for an electrode assembly according to an embodiment of the present application. FIG. 5 is a schematic sectional structural diagram of a winding device 400 of an electrode assembly according to an embodiment of the present application. FIG. 6 is a schematic sectional structural diagram of a winding device 400 of a electrode assembly according to another embodiment of the present application. FIG. 7 is a schematic structural diagram of a centering measuring tool 52 in a positioning member 50 according to an embodiment of the present application. FIG. 8 is a schematic structural view of a centering measuring tool 52 in the winding device 400 for an electrode assembly shown in FIG. 6.

As shown in FIG. 4 and FIG. 5, the winding device provided by the embodiment of the present application includes a winding pin 30, a clamping pin 40, and a positioning member 50. A first groove 32 is arranged on an outer peripheral surface of the winding pin 30, and the winding pin 30 is used for winding an electrode sheet and a separator. The clamping pin 40 is configured to be inserted into a second groove 51 of the positioning member 50. The positioning member 50 is used for positioning the relative positions of the clamping pin 40 and the winding pin 30.

Specifically, there are two clamping pins 40, the outer circumference of the winding pin 30 is provided with two first grooves 32, and the two clamping pins 40 are each used for being arranged in the two first grooves 32. The two clamping pins 40 are arranged parallel to each other, and the clamping pins 40 are capable of moving in a direction perpendicular to an axis of the winding pin 30. The clamping pins 40 move in the direction perpendicular to the axis of the winding pin 30, and may move up and down or move parallelly. The above technical solution is capable of adjusting the moving direction of the clamping pin 40 in the second groove 51, improving the flexibility of adjustment of the clamping pin 40, and ensuring that the clamping pin 40 moves in a preset direction in the second groove 51.

The winding pin 30 is a cylindrical structure and is capable of rotating around its own axis. Optionally, the winding pin 30 may include two semi-cylindrical half shafts 31, the two half shafts 31 are arranged opposite to each other, and the two half shafts 31 may clamp free ends of the positive electrode sheet, the separator, and the negative electrode sheet. One first groove 32 may be arranged on each half shaft 31, and the two first grooves 32 are substantially opposite to each other. The winding pin 30 may be made of aluminum alloy or alloy steel. Using the winding device 400 for an electrode assembly provided in the embodiment of the present application to wind and form the electrode sheet and the separator may be performed according to the following steps:

Firstly, the positive electrode sheet, the separator, and the negative electrode sheet are stacked, and then fixed ends of the three are fixed between the two semicircular half shafts 31 of the winding pin 30 to realize the fixation.

Secondly, the winding pin 30 rotates to wind the positive electrode sheet, the separator, and the negative electrode sheet onto the surface of the winding pin 30 to form a hollow cylindrical electrode assembly 23.

Again, the two positioning members 50 are respectively inserted into the corresponding two first grooves 32, and the second grooves 51 are arranged toward the direction of the electrode assembly 23.

Then, end portions of the two clamping pins 40 are aligned with the second grooves 51, and the clamping pins 40 are slowly moved in the axial direction of the winding pin 30. If interference occurs between the clamping pins 40 and the positioning members 50, the clamping pins 40 cannot be inserted, then the positions of the clamping pins 40 are adjusted and the clamping pins 40 continue to move until they are completely inserted into the second grooves 51, and the clamping pins 40 clamp the electrode assembly 23.

Finally, the clamping pins 40 clamp the electrode assembly 23 out of the winding pin 30, and the electrode assembly 23 is separated from the winding pin 30. Alternatively, the winding pin 30 is moved and pulled out, and the cylindrical electrode assembly 23 forms a hollow structure.

The positioning member 50 provided in the embodiment of the present application is used for being inserted into the first groove 32 on the outer peripheral surface of the winding pin 30, and the winding pin 30 is used for winding the electrode sheet and the separator. The positioning member 50 is provided with the second groove 51, and the second groove 51 is configured for a clamping pin 40 to insert so as to position relative positions of the first groove 32 and the clamping pin 40.

In the technical solution of the embodiment of the present application, the positioning member 50 is arranged in the first groove 32, and a part of a space in the first groove 32 is filled to ensure that the clamping pin 40 moves along a preset path with respect to the winding pin 30 in an axial direction of the winding pin 30, thereby limiting the moving direction of the clamping pin 40, preventing a position of the clamping pin 40 with respect to the winding pin 30 from being shifted in a moving process, and ensuring that the position of the clamping pin 40 with respect to the winding pin 30 is fixed, which is convenient for the clamping pin 40 to pick up an electrode assembly 23 after winding, and reduces a probability of wrinkling and deformation of the electrode assembly 23 in a clamping process, so as to ensure the quality of the electrode assembly 23.

In some embodiments of the present application, the positioning member 50 includes two centering measuring tools 52, the two centering measuring tools 52 are respectively placed in the two first grooves 32 of the same winding pin 30, and the two centering measuring tools 52 are each provided with a second groove 51. The second grooves 51 of the two centering measuring tools 52 are configured symmetrically with respect to the axis of the winding pin 30. The winding pin 30 of a winding device for the electrode assembly 23 itself has two first grooves 32, and the two first grooves 32 are symmetrically distributed with respect to an axial direction of the winding pin 30.

After the centering measuring tools 52 are placed in the first grooves 32, by arranging the second grooves 51 of the two centering measuring tools 52 to be symmetrical with respect to the axis of the winding pin 30, it is capable of ensuring that the two clamping pins 40, after arranged in the first grooves 32, are also basically symmetrical with respect to the axial direction of winding pin 30. When the clamping pins 40 clamp the wound electrode assembly 23, the two clamping pins 40 can respectively clamp the electrode assembly 23 on both sides, and divide the electrode assembly 23 into two parts with relatively equal arc lengths in a winding direction. Balanced forces on both sides of the electrode assembly 23 are capable of reducing the probability of wrinkling and deformation of the electrode assembly 23 in the clamping process, thereby further improving the product quality of the electrode assembly 23.

In some embodiments of the present application, the centering measuring tool 52 has a first surface 53 arranged toward the winding pin 30, and the shape of the first surface 53 matches that of an inner wall of the first groove 32 so as to attach the first surface 53 to the winding pin 30. The first surface 53 matches the shape of the first groove 32, which can facilitate the relative movement of the centering measuring tool 52 in the first groove 32. The centering measuring tool 52 further fills the first groove 32 to reduce a gap between the clamping pin 40 and the winding pin 30, and reduce the probability of positional shift during the movement of the clamping pin 40 into the first groove 32, thereby ensuring the positioning effect of the centering measuring tool 52.

As shown in FIG. 6, in some embodiments of the present application, the shape of the second groove 51 matches the shape of the clamping pin 40. The second groove 51 matches the outer shape of the clamping pin 40, which is capable of facilitating the movement of the clamping pin 40 in the second groove 51 and improving the positioning efficiency of the clamping pin 40.

In some embodiments of the present application, the centering measuring tool 52 is made of a metal material, and the Vickers hardness of the metal material is greater than or equal to 200 HV. The structural hardness of the centering measuring tool 52 is ensured, and interference from the centering measuring tool 52 during the movement of the clamping pin 40 means that the moving direction of the clamping pin 40 needs to be adjusted, and with the above structural hardness, it is capable of stopping in time the shifted clamping pin 40 from advancing, thereby ensuring the shift correction effect. Exemplarily, the centering measuring tool 52 may be made of stainless steel, aluminum alloy, and other materials.

In some embodiments of the present application, the extension length of the centering measuring tool 52 along the axial direction of the winding pin 30 is H, and 100 mm≤H≤150 mm. Setting a reasonable length of the centering measuring tool 52 is capable of reducing the difficulty of mounting and taking the centering measuring tool 52 and improving the efficiency under the premise of ensuring a centering effect of the clamping pin 40 and the winding pin 30.

Referring to FIG. 7, in some embodiments of the present application, the centering measuring tool 52 includes a filling portion 54 and a guide portion 55. The filling portion 54 is arranged in the first groove 32. The guide portion 55 protrudes out of the filling portion 54 along a surface of the filling portion 54 away from the winding pin 30. There are two guide portions 55, and the two guide portions 55 are arranged parallel to each other. The filling portion 54 and the two guide portions 55 jointly enclose to form the second groove 51. By arranging the filling portion 54, a gap in the first groove 32 is filled to reduce a gap between the clamping pin 40 and the winding pin 30, and the guide portion 55 is arranged to limit a moving direction of the clamping pin 40 with respect to the winding pin 30, so as to ensure that the clamping pin 40 moves in a specified path to limit the moving direction of the clamping pin 40 and ensure that a position of the clamping pin 40 with respect to the winding pin 30 meets a preset requirement.

Referring to FIG. 6, in the embodiment of the present application, the filling portion 54 may be completely arranged in the first groove 32, and at least a part of the guide portion 55 protrudes from the first groove 32. In the above structure, before the clamping pins 40 are used for clamping, the positioning member 50 may be used to position a vertical direction of the clamping pins 40 to ensure that a line connecting the centers of gravity of the two clamping pins 40 intersects the axis of the winding pin 30. Then the positioning member 50 is taken out, and horizontal relative positions of the two clamping pins 40 are adjusted to ensure that the clamping pins 40 completely enter the first groove 32. The height and horizontal position parameters of the clamping pins 40 are recorded, operation is performed according to the same parameters during clamping, and then the clamping pins 40 are used to clamp the electrode assembly 23, thereby reducing the probability of the electrode assembly 23 being wrinkled or broken.

Referring to FIG. 6 and FIG. 8 together, in some embodiments of the present application, the minimum distance between the two guide portions 55 is H1, and the thickness of the clamping pin 40 is D1, wherein 0.08 mm≤H1−D1≤0.15 mm. A reasonable gap is set between the clamping pin 40 and the second groove 51, which is capable of ensuring that the clamping pin 40 moves in the second groove 51 while interfering with the shift of the clamping pin 40, thereby providing a reasonable moving space for the clamping pin 40 while ensuring the shift correction effect.

In some embodiments of the present application, a surface of the centering measuring tool 52 is provided with a thickness identification used for matching the centering measuring tool 52 with winding pins 30 having first grooves 32 of different shapes and clamping pins 40 of different thicknesses. The thickness identification is used for displaying the thickness of the centering measuring tool 52 itself, including information such as the thickness of the guide portion 55 and the thickness of the filling portion 54. The above thickness needs to match different first grooves 32 and clamping pins 40 of different thicknesses. Identifying the thickness can facilitate an operator to choose a centering measuring tool 52 of a suitable size for matching according to different winding pins 30 and clamping pins 40, thereby improving the use efficiency.

The winding device 400 for an electrode assembly provided in the embodiment of the present application includes the positioning member 50 according to the above embodiment, a winding pin 30, and a clamping pin 40. A first groove 32 is arranged on an outer peripheral surface of the winding pin 30, and the winding pin 30 is used for winding an electrode sheet and a separator. The clamping pin 40 is configured to be inserted into a second groove 51 of the positioning member 50. The positioning member 50 is used for positioning the relative positions of the clamping pin 40 and the winding pin 30.

In the winding device 400 for the electrode assembly in the embodiment of the present application, the electrode sheet and the separator are wound and formed by arranging the winding pin 30, the clamping pin 40 is inserted into the first groove 32 of the winding pin 30 and stretches the electrode assembly 23 to form in the radial direction of the winding pin 30, and the electrode assembly 23 is pulled from the winding pin 30 in the axial direction of the winding pin 30 so that the electrode assembly 23 is stripped. In order to ensure that the moving direction of the clamping pin 40 with respect to the winding pin 30 meets a preset standard and reduces the probability of a movement shift of the clamping pin 40 in the first groove 32, the positioning member 50 is placed in the first groove 32, a part of the gap between the winding pin 30 and the clamping pin 40 is filled, and the clamping pin 40 moves in the second groove 51 of the positioning member 50, thereby improving the accuracy of the moving direction of the clamping pin 40, and realizing more accurate and stable clamping and releasing of the electrode assembly 23.

In some embodiments of the present application, there are two clamping pins 40, the outer circumference of the winding pin 30 is provided with two first grooves 32, and the two clamping pins 40 are each used for being arranged in the two first grooves 32. The two clamping pins 40 are arranged parallel to each other, and the clamping pins 40 are capable of moving in a vertical direction. The clamping pin 40 moves up and down in the vertical direction, which is capable of adjusting the moving direction of the clamping pin 40 in the second groove 51, improving the flexibility of adjustment of the clamping pin 40, and ensuring that the clamping pin 40 moves in a preset direction in the second groove 51.

The embodiments of the present application further provide a battery 100 manufacturing device, which includes the positioning member 50 in the above embodiment or the winding device 400 for an electrode assembly in the above embodiment.

The winding device 400 for an electrode assembly and the battery manufacturing device according to the embodiments of the present application both include the positioning member 50 in the above embodiment, the positioning member 50 is arranged in the first groove 32 of the winding pin 30, and a part of a space in the first groove 32 is filled to ensure that the clamping pin 40 moves along a preset path with respect to the winding pin 30 in an axial direction of the winding pin 30, thereby limiting the moving direction of the clamping pin 40, preventing a position of the clamping pin 40 with respect to the winding pin 30 from being shifted in a moving process, and ensuring that the position of the clamping pin 40 with respect to the winding pin 30 is fixed, which is convenient for the clamping pin 40 to pick up an electrode assembly 23 after winding, and reduces a probability of wrinkling and deformation of the electrode assembly 23 in a clamping process, so as to ensure the quality of the electrode assembly 23, and improve the yield and production efficiency of the battery 100.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various examples can be combined in any manner as long as there is no structural conflict. The present application is not limited to the specific embodiments disclosed herein, but rather includes all technical solutions falling within the scope of the claims.

The invention claimed is:

1. A winding device for an electrode assembly, comprising:

a positioning structure provided with a second groove, a winding pin, having a first groove arranged on an outer peripheral surface thereof, wherein the winding pin is configured to wind an electrode sheet and a separator; and a clamping pin, configured to be inserted into the second groove of the positioning structure;

wherein the positioning structure is configured for the clamping pin to be inserted into the second groove so as to position relative positions of the clamping pin and the winding pin.

2. The winding device according to claim 1, wherein the positioning structure comprises two centering measuring tools, which are respectively placed in two first grooves of the winding pin, the two centering measuring tools are provided with two second grooves, and the two second grooves are arranged symmetrically with respect to an axis of the winding pin.

3. The winding device according to claim 2, wherein each of the centering measuring tools has a first surface arranged toward the winding pin, and the shape of the first surface matches that of an inner wall of the first groove so as to attach the first surface to the winding pin.

4. The winding device according to claim 2, wherein a shape of the second groove matches a shape of the clamping pin.

5. The winding device according to claim 2, wherein the centering measuring tools are made of a metal material, and the Vickers hardness of the metal material is greater than or equal to 200 HV.

6. The winding device according to claim 2, wherein an extension length of each of the centering measuring tools in the axial direction of the winding pin is H, and $100\ mm \le H \le 150\ mm$.

7. The winding device according to claim 2, wherein each of the centering measuring tools comprises:

a filling portion arranged in the first groove;

two guide portions each protruding out of the filling portion along a surface of the filling portion away from the winding pin, wherein the two guide portions are arranged parallel to each other;

wherein the filling portion and the two guide portions jointly enclose to form the second groove.

8. The winding device according to claim 7, wherein a minimum distance between the two guide portions is $H_1$, and a thickness of the clamping pin is $D_1$, wherein $0.08\ mm \le H_1 - D_1 \le 0.15\ mm$.

9. The winding device according to claim 2, wherein a surface of each of the centering measuring tools is provided with a thickness identification, and the thickness identification used for matching each of the centering measuring tools with winding pins having first grooves of different shapes and clamping pins of different thicknesses.

10. The winding device according to claim 1, wherein there are two clamping pins, the outer circumference of the winding pin is provided with two first grooves, the two clamping pins are each used for being arranged in the two first grooves, the two clamping pins are arranged parallel to each other, and the clamping pins are capable of moving in a direction perpendicular to an axis of the winding pin.

11. A battery manufacturing device, comprising the winding device according to claim 1.

* * * * *